Nov. 18, 1969     D. S. CLEVELAND     3,479,562

ANTI-HUNTING CIRCUIT FOR METER RELAY

Filed May 5, 1967

INVENTOR
DONALD S. CLEVELAND

BY *Richard E. Hesley*

Figure 1:
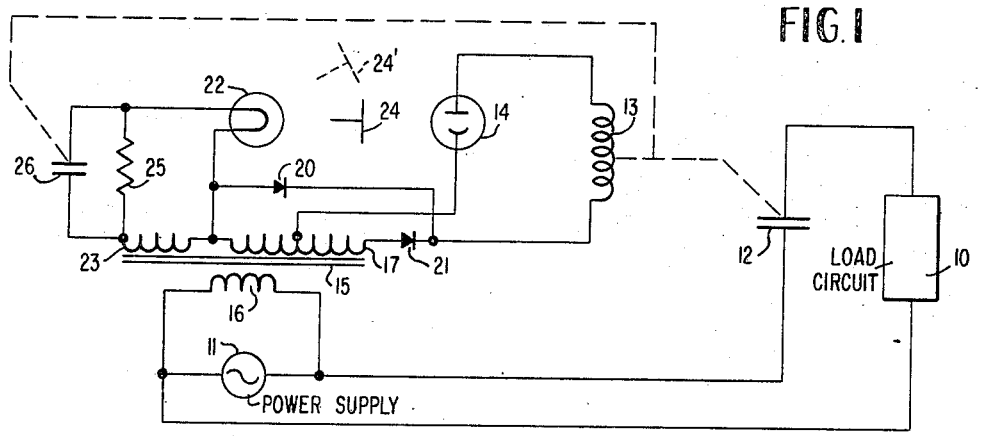

ATTORNEY y referring to the following description taken in conjunction with the accompanying drawings wherein:

FIGURE 1 illustrates a meter relay circuit utilizing this invention; and

Figure 2:
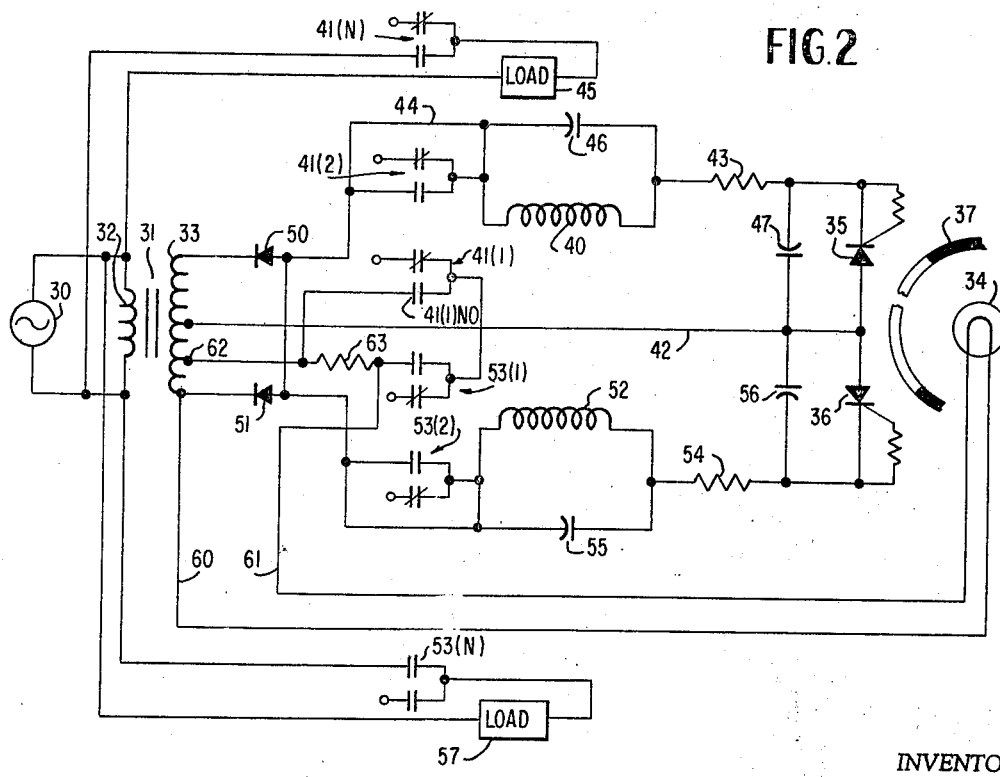

FIGURE 2 schematically depicts another embodiment of a meter relay utilizing this invention.

In FIGURE 1 a load circuit 10 is coupled to a power supply 11 by normally open (NO) contacts 12 controlled by a relay coil 13. Energization of the relay coil 13 is controlled by a radiant energy responsive device such as a photocell 14. The photoelectric circuitry is coupled to the power supply 11 by means of a transformer 15 having a primary 16 connected to the power supply 11. One secondary 17 is coupled through a rectifier network including rectifiers 20 and 21 to the photocell 14 and the relay coil 13 to provide a properly polarized bias for the photocell 14.

A source of radiant energy, a light source 22, energized by another transformer secondary 23, transmits light to the photocell 14 in response to the position of a masking vane 24. As known in the art, when the vane is in the position illustrated by the solid figure, no light passes to the photocell 14. Hence, the load remains de-energized. However, when the vane 24 moves to the position shown in phantom and designated 24', light can pass to the photocell 14 to energize the load circuit 10.

In accordance with this invention, a resistor 25 is connected in series with a lamp 22 and the transformer secondary 23. NO contacts 26, also controlled by the relay coil 13, shunt the resistor 25. When the vane 24 permits light to energize the photocell 14, the relay coil 13 is energized and the resistor 25 is shorted by the NO contacts 26, thereby effectively increasing the brightness of the lamp source 22 even if a line voltage drop occurs. The exact value of the resistor usually will be selected in accordance with the application but will generally increase in value as the stability and voltage regulation of the power supply decrease.

FIGURE 2 presents a schematic diagram of a circuit having two load circuits to which this invention can be specifically applied. A power supply 30 energizes a transformer 31 having a primary 32 and a secondary 33. A lamp 34 is connected to a portion of the transformer secondary 33 to be energized by an A-C component thereacross in a manner to be described hereinafter.

The photoelectric devices controlling the operation of the relays and associated circuitry are constituted by a light activated silicon controlled rectifier (LASCR) 35 and a LASCR 36. The transmission of light from the lamp 34 to either of the LASCR's 35 or 36 is controlled by a masking vane 37 associated in a meter relay. Details of the construction of the meter relay utilizing a particular shutter configured as that shown in FIGURE 2 are not included in this discussion as they are known in the art. One example of such a meter relay is claimed in the patent application of John A. Enright, Ser. No. 366,426, filed May 11, 1964, and assigned to the same assignee as the present invention. The invention claimed herein is applicable to any meter relay notwithstanding its exact structure, however.

Two multi-contract relays are associated with the two LASCR's. A first relay is composed of a relay coil 40 and a plurality of sets of contacts 41(1), 41(2) . . . 41(N). Each set of relay contacts includes normally open and normally closed contacts. Hereinafter particular relay contacts will be designated by their number and de-energized condition. For example, the normally open contacts associated with the relay set 41(1) will be referred to as contacts 41(1)NO.

Hence, a series circuit, adapted to be energized by a D-C potential, is constituted by a center-tap conductor 42, the LASCR 35, a dropping resistor 43, the relay coil 40, and a bypass conductor 44. When energy from the lamp 34 strikes the LASCR 35, the LASCR 35 conducts and energizes the relay coil. This causes the relay to pick up and close contacts 41(1)NO, 41(2)NO and 41(N)NO. If a load 45 is connected to contacts 41(N)NO and the power supply 30, the load 45 is energized. Closure of contacts 41(2)NO provides a holding function if a manual push-to-start button is substituted for the by pass conductor 44. A capacitor 46 in parallel with the relay coil 40 serves to sustain current flow through the relay coil 40 as known in the art. A capacitor 47 bypasses voltage transients to protect the LASCR 35. This relay circuit is energized by a full wave rectifier network constituted by the diodes 50 and 51 and energized by the secondary 33 so a D-C voltage appears between the anodes of the diodes and the center-tap conductor 42.

A similar relay circuit comprises, in series, a relay coil 52, sets of contacts 53(1), 53(2) . . . 53(N), the center-tap conductor 42, the LASCR 36, and a dropping resistor 54. Capacitor 55 serves a similar purpose as capacitor 46. Likewise, a capacitor 56 serves the same purpose as the capacitor 47. The plurality of sets of relay contacts, energized by the relay coil 52 and controlled by the LASCR 36, energize a load 57 connected thereto when light strikes the LASCR 36.

The lamp 34 is energized by a portion of the transformer 33. A conductor 60 is connected to one terminal of the lamp 34 while another conductor 61 is connected to a tap 62 on the transformer secondary 33 by means of a dropping resistor 63. In parallel with the dropping resistor 63 are contacts 41(1)NO and 53(1)NO in series. Therefore, when the masking vane 37 is in such a position as to energize neither LASCR 35 or 36, either LASCR 35 or 36 but not both, the shunting network constituted by the two contacts is an effective open circuit so that the dropping resistor 63 is in series with the lamp source. However, when the shutter moves to the position shown in FIGURE 2 so that light strikes both LASCR's 35 and 36, both contacts 41(1)NO and 53(1)NO close, thereby shunting the dropping resistor 63 to effectively decrease the series impedance and therefore decrease the voltage required to maintain the lamp 34 at a constant intensity.

It will be obvious to those skilled in the art that any arrangement of contacts across the dropping resistor 63 can be utilized, and this will be dependent upon the particular application. For example, one particular application to which this specific circuit is adapted is a furnace network wherein it is desired to slowly heat a furnace to a first temperature and then subsequently heat the furnace at a second, greater rate to a second temperature. If it is assumed that the shutter 37 revolves clockwise with increasing temperature, then when the circuit is energized, light will strike the LASCR 36 but not the LASCR 35 so that contacts 53(N)NO close to energize a heating element, the load circuit 57. Simultaneously, contact 53-(1)NO also closes, partially completing the shunt around the dropping resistor 63. When the temperature reaches a first point at which it is desirable to energize the second heating element, the load circuit 45, the shutter 37 permits light to pass to the LASCR 35 and the LASCR 36. This energizes the relay coil 40, causing contact 41(N)NO to close and energize the second heating element while the first heating element also remains energized. When the second heating element is energized, the power supply voltage may drop sufficiently to cause the lamp 34 to dim. However, simultaneously with any such voltage drop, contacts 41(1)NO close and complete the shunt around the dropping resistor 63. If the value of the dropping resistor 63 is properly selected, the lamp 34 maintains a sufficient intensity with the decreased line voltage to sustain the energization of the relay coils 40 and 52.

Briefly summarizing, the dropping resistors 25 shown in FIGURE 1 and 63 shown in FIGURE 2 constitute switchable impedance means. The contacts 26 or 41(1)NO and 53(1)NO constitute switching means connected to the impedance means and controlled by the meter relay. The meter relay is a load controlling means, and the impedance 63 assumes its high and low values when the load is energized at minimum and maximum levels, respectively. Various modifications and substitutions can therefore be made in a circuit without departing from the true spirit and scope of this invention. For example, different switching arrangements, other meter relay constructions, and other relay control circuits can all be used. Therefore, it is the intent in the appended claims to cover all such variations which come within the true spirit and scope of this invention.

What is claimed as new and desired to be secured by Letters Patent of the United States is:

1. A meter relay controller for providing a plurality of control actions to vary load energization levels of a load by a power supply in response to a process variable at first and second predetermined conditions comprising:
    (a) a lamp,
    (b) first and second light-responsive means for varying the energization level in response to light,
    (c) a meter movement having a light gate affixed thereto coupling light to said light-responsive means to energize the load at a plurality of levels in accordance with the value of the measured variable,
    (d) resistance means in series with said lamp and the power supply to connect said lamp thereto, and
    (e) first and second switches energized in response to light impinging on said first and second light-responsive means and connected to short-circuit said resistance means at maximum energization of the load.

2. A meter relay controller as recited in claim 1 wherein said first and second light-responsive means each includes relay systems having a relay coil, said first and second switches being constituted by contacts controlled by said relay coils in the first and second light-responsive means, said resistance means being constituted by a resistance and said switches being connected to short-circuit said resistor when the load is energized at a maximum level.

3. A meter relay controller as recited in claim 2 wherein said first and second light-responsive means are adapted to be energized at a low point of the process and a high point of the process so that said load is energized at a maximum level when both said light-responsive means are energized, said first and second switches being constituted by first and second normally open contacts in series, said pair of switches being in parallel with said resistor, whereby said resistor is short-circuited when light impinges both said first and second light-responsive means.

References Cited
UNITED STATES PATENTS

| | | | |
|---|---|---|---|
| 2,221,588 | 11/1940 | Kovalsky | 307—102 X |
| 2,236,255 | 3/1941 | Young | 250—231 |
| 2,756,382 | 7/1956 | Wuerth | 323—96 X |
| 3,010,026 | 11/1961 | Schake | 250—231 |

JAMES W. LAWRENCE, Primary Examiner

E. R. LA ROCHE, Assistant Examiner

U.S. Cl. X.R.

250—205, 231